(12) United States Patent
Ashikawa

(10) Patent No.: US 7,516,913 B2
(45) Date of Patent: Apr. 14, 2009

(54) CARTRIDGE CASE FOR MAGNETIC TAPE CARTRIDGE AND MAGNETIC TAPE CARTRIDGE

(75) Inventor: Teruo Ashikawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 22 days.

(21) Appl. No.: 11/934,920

(22) Filed: Nov. 5, 2007

(65) Prior Publication Data
US 2008/0105775 A1 May 8, 2008

(30) Foreign Application Priority Data
Nov. 6, 2006 (JP) .............................. 2006-300251

(51) Int. Cl.
*G11B 23/107* (2006.01)
(52) U.S. Cl. ...................... 242/348; 360/132
(58) Field of Classification Search ............. 242/332.4, 242/338, 338.1, 343, 344, 348, 348.2, 912, 242/347; 360/132
See application file for complete search history.

(56) References Cited

U.S. PATENT DOCUMENTS

| 6,299,088 | B1 | 10/2001 | Rambosek | |
|---|---|---|---|---|
| 6,304,416 | B1* | 10/2001 | McAllister et al. | 360/132 |
| 6,481,658 | B1* | 11/2002 | Shiga et al. | 242/348 |
| 6,577,471 | B1* | 6/2003 | Morita et al. | 360/132 |
| 6,817,563 | B2* | 11/2004 | Iino | 242/348 |
| 7,064,926 | B2* | 6/2006 | Kitamura et al. | 360/132 |
| 7,227,721 | B1* | 6/2007 | Kientz et al. | 360/132 |
| 7,240,825 | B2* | 7/2007 | Tada | |
| 2003/0002214 | A1* | 1/2003 | Kitamura et al. | 360/132 |
| 2003/0089809 | A1* | 5/2003 | Maekawa et al. | 242/332.4 |
| 2005/0133583 | A1* | 6/2005 | Tada | |
| 2007/0058290 | A1* | 3/2007 | Tada et al. | 242/348 |

FOREIGN PATENT DOCUMENTS

| JP | 2005-322412 A | 11/2005 |
|---|---|---|
| JP | 2006-065924 A | 3/2006 |

* cited by examiner

*Primary Examiner*—William A Rivera
(74) *Attorney, Agent, or Firm*—Young & Thompson

(57) ABSTRACT

A cartridge case for a magnetic tape cartridge made up of two mating shell halves are provided with a retaining structure for retaining an in-cartridge memory tag at a given angle in the cartridge case. The retaining structure comprises supporting brace members in one mating shell halve which has an angled surface extending at an elevation angle equal to the given angle and holding brace members in the other mating shell halve which has an angled leading surface extending at a depression angle equal to the elevation angle of the angled surface of the support brace member and a angled trailing surge extending at a depression angle greater than the angled leading surface between which the in-cartridge memory tag is held tightly in position in the cartridge case when the two mating shell halves are temporarily or finally coupled to each other.

7 Claims, 10 Drawing Sheets

CARTRIDGE CASE FOR MAGNETIC TAPE CARTRIDGE AND MAGNETIC TAPE CARTRIDGE

BACKGROUND OF THE INVENTION

1. Field of the Invention

The present invention relates to a cartridge case for a magnetic tape cartridge and a magnetic tape cartridge comprising a cartridge case and a tape reel contained in the cartridge case and, more particularly, to a magnetic tape cartridge case having a tape reel chamber for receiving a tape reel therein and a retainer for retaining a flexible sheet-formed memory tag out of the tape reel chamber and a magnetic tape cartridge comprising a cartridge case, a tape reel with a magnetic tape wound around and a flexible sheet-formed memory tag.

2. Description of Related Art

Typically, magnetic tape cartridges are widely used as a recording device of an external memory equipment of a computer. Such a magnetic tape cartridge comprises a single tape reel with a magnetic tape wound thereon and a cartridge case for receiving and supporting the tape reel for rotation therein. As magnetic tapes are used as a recording medium for storing an important piece of information such as computer data, the magnetic tape cartridge is made up so as to keep a magnetic tape out of troubles such as jamming and prevent it from being accidentally driven out of the cartridge case. Further, the magnetic tape cartridge is provided with an in-cartridge memory device which contains information such as the manufacturing data, the contents and the like of the magnetic tape cartridge. The in-cartridge memory device is provided with a semiconductor memory chip which enables recording and reading information about the magnetic tape itself and information recorded on the magnetic tape in a non-contact manner such as electromagnetic induction. Therefore, the in-cartridge memory device facilitates quick identification of the information contained in the magnetic tape cartridge without directly playing back the magnetic tape in the magnetic tape cartridge.

The in-cartridge memory device is installed in the cartridge case out of the way of rotation of the tape reel and is retained at a given angle in the cartridge case so as to enable a read-write device of an external memory equipment to record and read information on the in-cartridge memory device in a non-contact manner without troubles. A memory device retainer for retaining an in-cartridge memory device in position at a given angle with respect to the read-write device of an external memory equipment in a magnetic tape cartridge has been known in various forms. The memory device retainer comprises support members which are provided in two parts in two mating case sections, respectively, so as to retain the memory device tightly.

One of the memory device retainers that is incorporated in a data storage cartridge disclosed in U.S. Pat. No. 6,299,088 comprises a rear-positioning member having an angled surface formed in one of first and second case sections of a cartridge case for supporting a memory chip in position and a retaining post formed in the other case section for positioning the memory chip in position on the rear-positioning member. Another memory device retainer that is disclosed in Japanese Unexamined Patent Publication No. 2006-65924 comprises a pair of supporting braces formed in a lower case for supporting one of opposite surfaces of a memory board at a given angle thereon and a pair of holding plates formed in an upper case for holding down the memory board supported at the given angle against the supporting braces when the memory board tends to accidentally rise up due to vibrations of the under case.

Further, Japanese Unexamined Patent Publication No. 2005-322412 discloses one of general magnetic tape cartridges which is provided with an elastic member engaged with an antirotation gear for arresting a tape reel in order to prevent a magnetic tape from jamming due to accidental rotations of the tape reel during nonuse of such a magnetic tape cartridge. When temporarily coupling the first and second or upper and lower case sections to a magnetic tape cartridge before permanently fixing the first and second case sections together, the elastic member in the cartridge case forces the first and the second case section through the tap reel and, in consequence, possibly causes separation of the first and second e case section from each other. In this event, it is feared that the memory device gets out of the cartridge case through a clearance gap formed due to separation between the first and second case sections depending on circumstances. If the memory device is held out of position by the retaining structure in the cartridge case even though remaining within the cartridge case, even granting that the memory device encounters no defective recording at the earliest use of the magnetic tape cartridge, it is not improbable that the memory device encounters defective recording resulting from the progress of deterioration of a surface protective layer of the memory device due to damages by the retaining structure.

In the data storage cartridge disclosed in U.S. Pat. No. 6,299,088, which is of LTO type, a housing is assembled by connecting the first section and the second case sections together by setscrews inserted into bores of cylindrical posts provided on the first case section and tightened in openings of cylinders provided on the second case section. According to this structure, in order to assemble the data storage cartridge, it is essentially inevitable to flip or turn the data storage cartridge upside down in position after a memory chip installation stage where the second case section is put on top of the first case section and temporarily coupled together in order to be prepared to a cartridge case fixing stage where the first case section and the second case section are secured together with setscrews. In the case where the data storage cartridge is flipped upside down in position as just described above between the memory chip installation stage and the cartridge case fixing stage, the temporarily coupled first and second case sections enhances the possibility that a clearance gap is formed due to separation between the first and second case sections. In order to prevent a formation of a clearance gap between the first and second case sections, it is conceivable to hold the temporarily coupled first and second case sections firmly tight so as thereby to prevent the first and second case sections from producing a clearance gap while turning the data storage cartridge upside down in position. However, it is feared that the first and second case sections are undesirably damaged due to external force applied thereto.

Therefore, in the existing circumstances, there is a strong demand for a magnetic tape cartridge case comprising two case sections and a magnetic tape cartridge in which an in-cartridge memory hip retained by retaining means provided partly in one case section and partly in the other case section is prevented from getting out of the magnetic tape cartridge case or appropriately retained in position even when the two case sections are separated apart.

SUMMARY OF THE INVENTION

It is therefore an object of the present invention to provide a magnetic tape cartridge case with a flexible sheet-formed in-cartridge memory device installed therein which prevents the flexible sheet-formed in-cartridge memory device from getting out of the magnetic tape cartridge case and appropriately retains it in position even when two case sections forming the magnetic tape cartridge case are separated apart. It is another object of the present invention to provide a magnetic tape cartridge comprising the magnetic tape cartridge case, a tape reel with a magnetic tape and a flexible sheet-formed in-cartridge memory tag installed in the magnetic tape cartridge case which prevents the flexible sheet-formed in-cartridge memory tag from getting out thereof and appropriately retains it in position even when two case sections forming the magnetic tape cartridge case are separated apart.

The foregoing objects of the present invention are accomplished by a cartridge case for a magnetic tape cartridge provided with a tape reel received for rotation in the cartridge case and a flexible sheet-formed in-cartridge memory tag fixedly received in the cartridge case. The cartridge case comprises a case shell comprising two mating shell halves each of which comprises a rectangular base plate section and a peripheral wall section extending upright from and surrounding the rectangular base plate section and which form a first or reel chamber for receiving the tape reel for rotation therein and a second or memory tag chamber formed out of the reel chamber for receiving the flexible sheet-formed in-cartridge memory tag therein by mating the peripheral wall sections of the two mating shell halves with each other and retaining means disposed in the memory tag chamber for fixedly retaining the flexible sheet-formed in-cartridge memory tag at a given angle. The retaining means comprises at least a pair of supporting braces fixedly provided in one of the two mating shell halves for supporting the flexible sheet-formed in-cartridge memory tag thereon and at least one holding brace fixedly provided in the other of the two mating shell halves for holding down the flexible sheet-formed in-cartridge memory tag supported on the supporting braces. Each supporting brace has an angled surface extending toward the peripheral wall section of the one mating shell half at an elevation angle equal to the given angle with the base plate section of the one mating shell half The holding brace has an angled leading surface extending toward the peripheral wall section of the other mating shell half at a depression angle equal to the given angle with, for example, the base plate section of the other mating shell half and an angled trailing surface extending continuously from the angled leading surface to the peripheral wall section of the other mating shell half at a depression angle greater than the given angle with, for example, the base plate section of the other mating shell half so as to form a wedge-shaped capture groove between the angled trailing surface and the peripheral wall section of the other mating shell half The angled trailing surface may comprise a plurality of surfaces having depression angles gradually increasing in order from the angled leading surface.

According to the cartridge case for a magnetic tape cartridge, because, while the supporting brace has the angled surface on which the flexible sheet-formed in-cartridge memory tag is mounted and supported at the given angle, the holding brace has the angled leading surface extending toward the peripheral wall section of the other mating shell half at an angle equal to the given angle with the base plate section of the other mating shell half and the angled trailing surface extending continuously from the leading surface to the peripheral wall section of the other mating shell half at a depression angle greater than the given angle, when the flexible sheet-formed in-cartridge memory tag is released from the retaining means due to separation of the two mating shell halves temporarily coupled together that is caused as a result of flipping or turning the magnetic tape cartridge upside down in position, the flexible sheet-formed in-cartridge memory tag slides downward the angled leading surface and then the angled trailing surface angulated more sharply than the angled leading surface toward the peripheral wall section of the other mating shell half, and is finally captured in the wedge-shaped capture grooves. Therefore, the flexible sheet-formed in-cartridge memory tag is always prevented from getting out of the magnetic tape cartridge case during assembling.

Further, when the two mating shell halves are fixedly attached together by connecting the peripheral wall sections of the two mating shell halves with setscrews in a state where the flexible sheet-formed in-cartridge memory tag is captured in the wedge-shaped capture grooves with its major part leaning on the angled trailing surface of the holding brace and the remaining part overhanging the angled leading surface of the holding brace, the flexible sheet-formed in-cartridge memory tag is pressed at the overhanging part by the angled surface of the supporting brace of the one mating shell half. In consequence, the flexible sheet-formed in-cartridge memory tag is elastically deflected in bending and then bounced off from the peripheral wall section by a restoring force to restore its original form. As a result, when the two mating shell halves are tightly attached together, the flexible sheet-formed in-cartridge memory tag is tightly held appropriately at the given angle in position between the angled leading surface of the holding brace and the angled surfaces of the supporting braces.

The holding brace has a boundary between the leading and angled trailing surfaces located on one side of a center of gravity of the flexible sheet-formed in-cartridge memory tag supported in position on the supporting braces opposite to the peripheral wall section of the other mating shell half.

According to this embodiment, since the flexible sheet-formed in-cartridge memory tag on the angled leading surfaces of the holding braces has its center of gravity on a side of the boundary opposite to the angled leading surfaces of the holding braces, the holding braces enable the flexible sheet-formed in-cartridge memory tag to easily slide down on the angled trailing surface when the flexible sheet-formed in-cartridge memory tag is released from the retaining means due to separation of the two mating shell halves that is caused as a result of flipping or turning the magnetic tape cartridge upside down.

The cartridge case is suitably used for a magnetic tape cartridge comprising a magnetic tape reel received for rotation in the reel chamber and an in-cartridge memory tag in the form of a generally rectangular flexible sheet with a memory chip embedded therein. The in-cartridge memory tag is installed in the cartridge case with an accessible surface thereof facing to the peripheral wall section of the one mating shell half at the elevation angle.

BRIEF DESCRIPTION OF THE DRAWINGS

The foregoing and other objects and features of the present invention will be clearly understood from the following detailed description when reading with reference to the accompanying drawings wherein same reference numerals denote the same parts throughout the drawings, and in which.

DETAILED DESCRIPTION OF THE PREFERRED EMBODIMENTS

In the following description, the term "temporary coupling" shall mean and refer to coupling two mating shell halves together by bringing peripheral wall sections of them into contact with each other to make a closed case shell before completely connecting them with setscrews.

Figure 1:
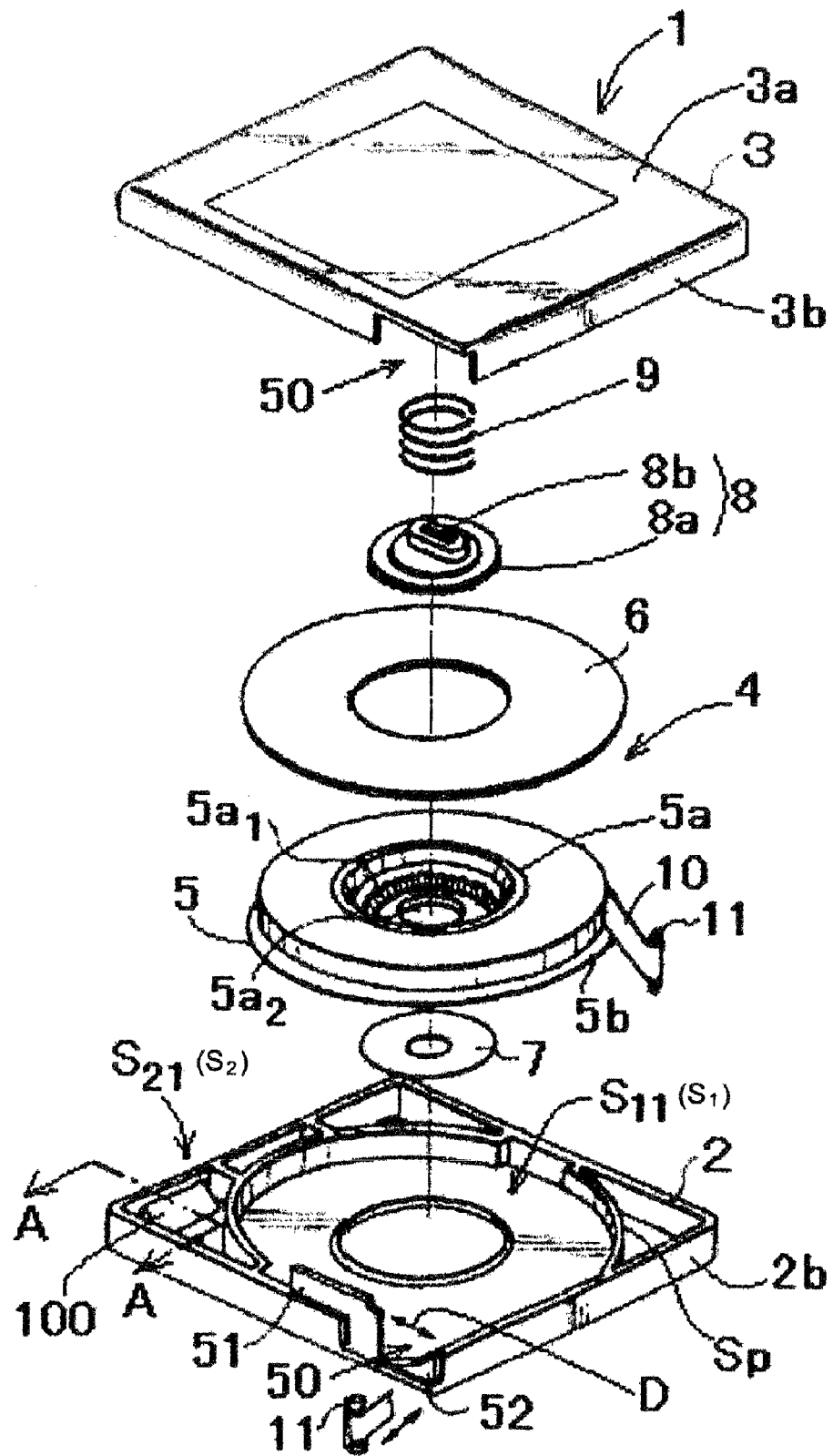
FIG. 1 is an exploded perspective view of a cartridge case for a magnetic tape cartridge according to an embodiment of the present invention.
Figure 2:
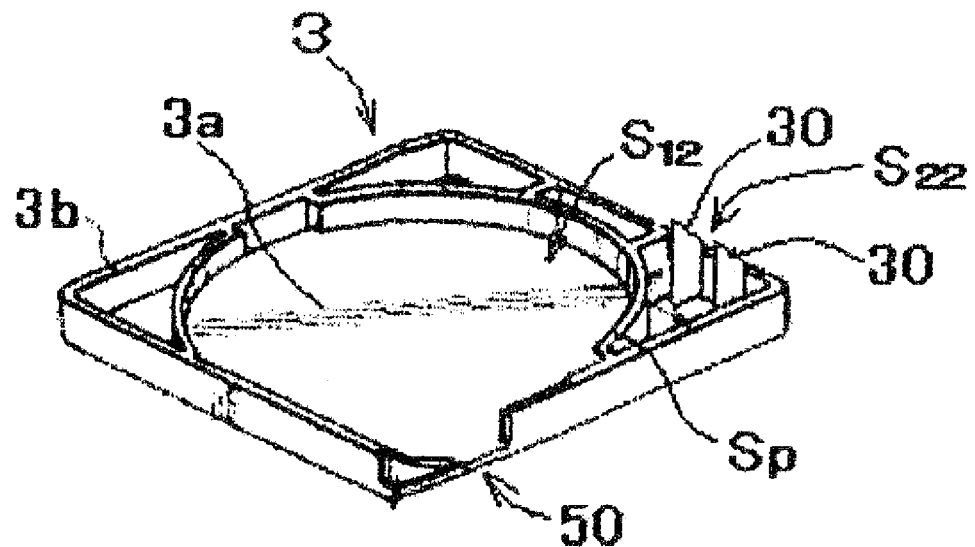
FIG. 2 is a perspective view of a second mating shell half of two mating shell halves of a case shell forming a cartridge case.

Referring to the accompanying drawings in detail, FIG. 1 shows magnetic tape cartridge 1 of an LTO type in an exploded perspective view, and FIG. 2 shows one of two mating shell halves of a case shell of a cartridge case of the magnetic tape cartridge 1. As shown in FIG. 1, the magnetic tape cartridge 1 includes a cartridge case comprising a case shell made up of two mating shell halves, namely a first or base mating shell half 2, which is generally used as a dimensional base structure for assembling the magnetic tape cartridge and a second or top mating shell half 3, a tape reel 4 with a magnetic tape wound thereon and a flexible sheet-formed in-cartridge memory tag 100. The first mating shell half 2 comprises a rectangular base plate section 2a having a center opening therein, a peripheral wall section 2b extending upright from and surrounding the rectangular base plate section 2a and internal arcuate partitions $S_{P1}$ by which a generally circular space is defined in the first mating shell half 2. Similarly, as shown in FIG. 2, the second mating shell half 3 comprises a rectangular base plate section 3a and a peripheral wall section 3b extending upright from and surrounding the rectangular base plate section 3b and internal arcuate partitions $S_{P2}$ by which a generally circular space is defined in the second mating shell half 3. When the second mating shell half 3 is put on top of the first mating shell half 2 to form a closed cartridge case shell, there are provided a first chamber (reel chamber) $S_1$ defined in the form of circle by the arcuate partitions $S_{P1}$ and $S_{P2}$ of the first and second mating shell halves 2 and 3 for receiving the tape reel 4 therein and a second chamber (memory tag chamber) $S_2$ defined at one corner of the case shell by and between the peripheral wall sections 2b and 3b and the partitions $S_{P1}$ and $S_{P2}$ for receiving the flexible sheet-formed in-cartridge memory tag 100 therein. In the case of an LTO type magnetic tape cartridge, the first mating shell half 2 is used as a dimensional base structure provided with a plurality of through bores and, on the other hand, the second mating shell half 3 is provided with the same number of counter pits. When assembling the first mating shell half 2 and the second mating shell half 3 to a magnetic tape cartridge 1, the second mating shell half 3 is temporarily coupled to the first mating shell half 2 with the tape reel 4 and the flexible sheet-formed in-cartridge memory tag 100 received in the reel chamber $S_1$ and the memory tag chamber $S_2$, respectively, in position by bringing the peripheral wall sections 2b and 3b into contact with each other. Subsequently, after flipping or turning the coupled case shell upside down, setscrews are plunged into the pits of the second mating shell half 3 through the through bores of the first mating shell half 2 and tightened so as thereby to fixedly connect the first mating shell half 2 and the second mating shell half 3 completely together. The setscrew heads are concealed within the through bores.

The tape reel 4 on which a magnetic tape 10 is wound beforehand comprises a single unit having a first flange member 5 and a second flange member 6 secured to each other by ultrasonic welding. The first flange member 5 has a cylindrical hollow hub section 5a and a circular flange section 5b extending from an outer periphery of the cylindrical hub section 5a which are formed as an integral piece made of a synthetic resin. The tape reel 4 is provided with a magnet wheel 7 functioning as a part of drive means secured to an outer surface of the circular flange section 5b and an internal gear $5a_1$ fixedly disposed within the cylindrical hollow hub section 5a which engages with a lock gear 8a formed on a periphery of a lock button 8 so as thereby to prevent the tape reel 4 for from rotating during nonuse of the magnetic tape cartridge 1. The reel hub section 5a has an opening $5a_2$ into which an unlocking spindle of a read-write device (not shown) such as an external memory equipment for use with the magnetic tape cartridge 1 enters to push up the brake button 8a so as thereby to disengage the lock gear 8a of the lock button 8 from the internal gear $5a_1$ of the reel hub section 5a The lock button 8 is provided with a boss 8a having a fitting groove which extends towards the second mating shell half 3 so as to receive a lock guide jut (not shown) of the second mating shell half 3. The lock button 8a is forced by a coil spring 9 disposed between the second mating shell half 3 and the lock button 8 so as to keep the lock gear 8a in engagement with the internal gear $5a_1$ of the reel hub section 5a, thereby preventing rotation of the tape reel 4 while the magnetic tape cartridge 1 is not in used, in other words, until the lock button 8a is pushed up against the coil spring 9 by an unlocking spindle of a read-write device such as an external memory equipment. On the other hand, when the magnetic tape cartridge 1 is accessed by an unlocking spindle of a read-write device, the lock button 8a is pushed up against the coil spring 9 by the unlocking spindle to disengage the lock gear 8a from the internal gear $5a_1$ of the reel hub section 5a, thereby permitting rotation of the tape reel 4.

The cartridge case is provided with a slide door 51 movable in opposite directions D in the case shell. The slide door 51 is forced closed by a spring (not shown) to prevent dust and foreign matters from getting into the cartridge interior through a tape egress/ingress slot 50 formed by cuts formed in the peripheral wall sections 2b and 3b of the first and second mating shell halves 2 and 3, respectively, and moved open against the spring to permit tape movement into and out of the cartridge interior via the tape egress/ingress slot 50. The cartridge case is further provided with a dent 52 formed by cuts formed in the peripheral wall sections 2b and 3b of the first and second mating shell halves 2 and 3, respectively, and located adjacent to the tape egress/ingress slot 50 which for receives a leader pin 11 attached to a leading end of the magnetic tape 10 completely wound around the tape reel 4. As is well known in the art the leading pin 11 works as means which is caught by a rear-write device and directed into a tape travel path of the read-write device.

When the magnetic tape cartridge 1 is set in a read-write device, an unlocking spindle of a read-write device intrudes into the opening $5a_2$ of the reel hub section 5a to push up the brake button 8a, thereby disengaging the lock gear 8a of the lock button 8 from the internal gear $5a_1$ of the reel hub section 5a and permitting the tape reel 4 to rotate. At the same time, the magnet wheel 7 of the tape reel 4 is attracted by magnetic drive means of the read-write device so that the tape reel 4 is ready for rotation when the magnetic drive means is activated. On the other hand, when the slide door 51 is moved open against the spring, the leading pin 11 is caught by a rear-write device and directed into a tape travel path of the read-write device so as to place the magnetic tape 10 in position for reading and writing.

Figure 3:
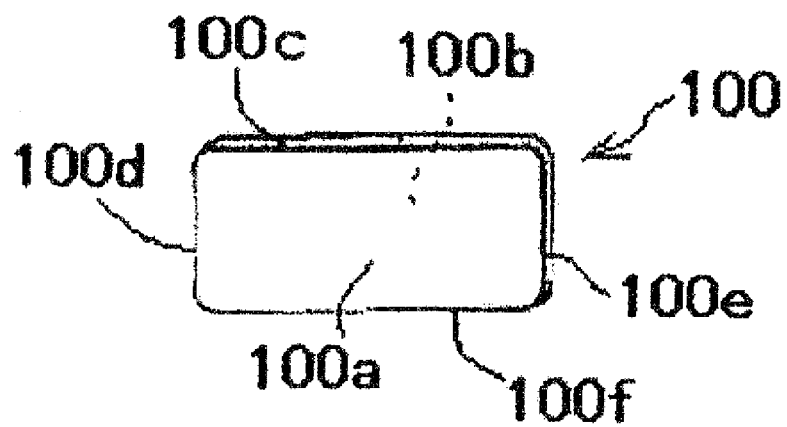
FIG. 3 is a schematic view of a flexible sheet-formed in-cartridge memory tag which is installed in a magnetic tape cartridge.

FIG. 3 shows a flexible sheet-formed in-cartridge memory tag 100 which is installed in the memory tag chamber $S_2$ formed at one corner of the case shell by and between the peripheral wall sections 2b and 3b and the partitions $S_{P1}$ and $S_{P2}$. The flexible sheet-formed in-cartridge memory tag 100 is made of a flexible sheet having a generally rectangular shape in which a semiconductor memory chip is embedded. The flexible sheet-formed in-cartridge memory tag 100 is known in various forms and takes any form well known in the art. The flexible sheet-formed in-cartridge memory tag 100 has an accessible side 100a from which information is written on or read out from the memory chip in a non-contact manner such as electromagnetic induction or by a RFID Radio Frequency Identification) system, a back side 100b, a top edge 100c, a left edge 100d, a right edge 100e and a bottom edge 100f. In order to enable a read-write device to read information from and write information on the memory chip of the flexible sheet-formed m-cartridge memory tag 100 without defects, it is essential to the flexible sheet-formed in-cartridge memory tag 100 that the accessible side 100a is positioned at a given angle, for example 45° in his embodiment, with a read-write device, in other words, with the base plate section 2a of the first mating shell half 2. On that account, the cartridge case is provided with a memory tag retaining means comprising two parts incorporated in the first and second mating shell halves 2 and 3 of the case shell, respectively.

Figure 4A:
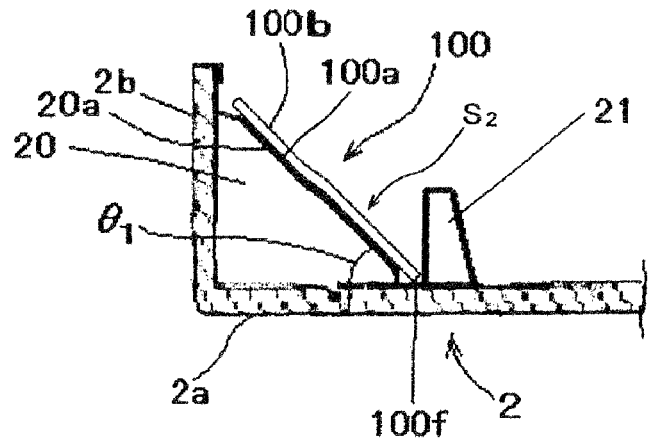
FIG. 4A is a side view of a first part of retaining means for retaining a flexible sheet-formed in-cartridge memory tag which is incorporated in a first mating shell half of the two mating shell halves.
Figure 4B:
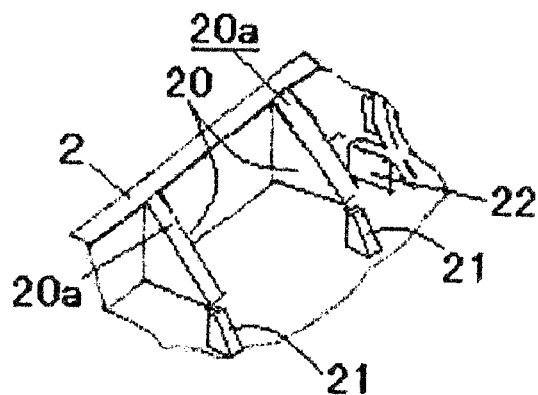
FIG. 4B is a perspective view of the side view of the first part of the retaining means of the first mating shell half.
Figure 4C:
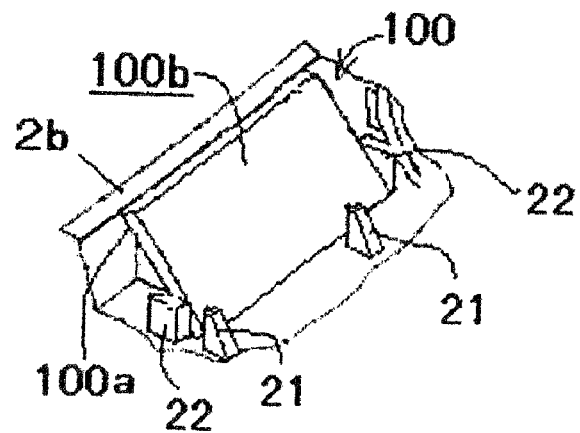
FIG. 4C is a perspective view of the side view of the first part of the retaining means with a flexible sheet-formed in-cartridge memory tag supported thereon.

FIGS. 4A, 4B and 4C show a first part structure of the memory tag retaining means incorporated in the first mating shell half 2 for supporting the flexible sheet-formed in-cartridge memory tag 100 at a given angle with the base plate section 2a of the first mating shell half 2 from the accessible side 100a The first part structure comprises a pair of supporting braces 20, a pair of bottom edge stoppers 21 and a pair of lateral edge stoppers 22. Each of the supporting braces 20 is formed as a triangular-shaped brace member having an angled surface 20a which is fixedly disposed, or otherwise formed as an integral part of the first mating shell half 2, between the base plate section 2a and the peripheral wall section 2b in the memory tag chamber $S_2$. The angled surface 20a is angulated at an elevation angle $\theta_1$, i.e. 45°, with the base plate section 2a so that the flexible sheet-formed in-cartridge memory tag 100 is supported on the supporting braces 20 at a given angle with the base plate section 2a of the first mating shell half 2. In the case where the peripheral wall section 2b extends vertically from the base plate section 2a, the supporting brace 20 is shaped in an isosceles right triangle. Each of the forward edge stoppers 21 extends vertically from the base plate section 2a of the first mating shell half 2 in front of the supporting braces 20 so as to stop the bottom edge 100f of the flexible sheet-formed in-cartridge memory tag 100 placed on the supporting braces 20 in position and prevent the flexible sheet-formed in-cartridge memory tag 100 from crawling down from the supporting braces 20. The lateral edge stoppers 22 extend vertically from the base plate section 2a of the first mating shell half 2 on opposite outer sides of a pair of the supporting braces 20 so as to stop the left edge 100d and the right edge 100d of the flexible sheet-formed in-cartridge memory tag 100 on the supporting braces 20 in transverse position and prevent lateral movement of the flexible sheet-formed in-cartridge memory tag 100 on the supporting braces 20. As shown in FIG. 4C, the flexible sheet-formed in-cartridge memory tag 100 is supported at the elevation angle $\theta_1$ on the supporting braces 20 and prevented from lengthwise and crosswise movement beyond allowable limits by the forward edge stoppers 21 and the lateral edge stoppers 22.

Figure 5A:
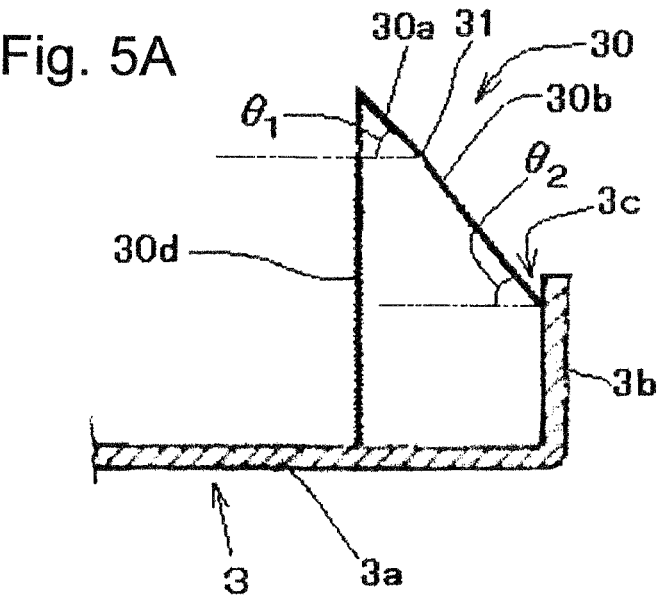
FIG. 5A is a side view of a second part of the retaining means which is incorporated in the second mating shell half of the two mating shell halves.
Figure 5B:
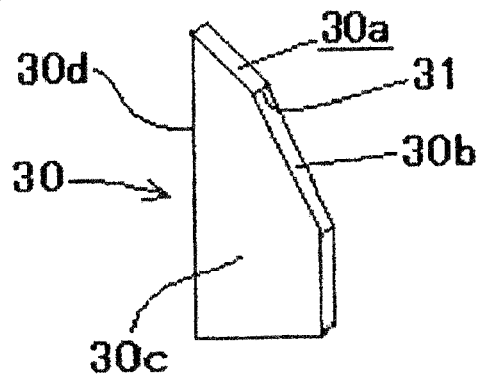
FIG. 5B is a perspective view of a holding brace forming a substantial member of the second part of the retaining means.
Figure 5C:
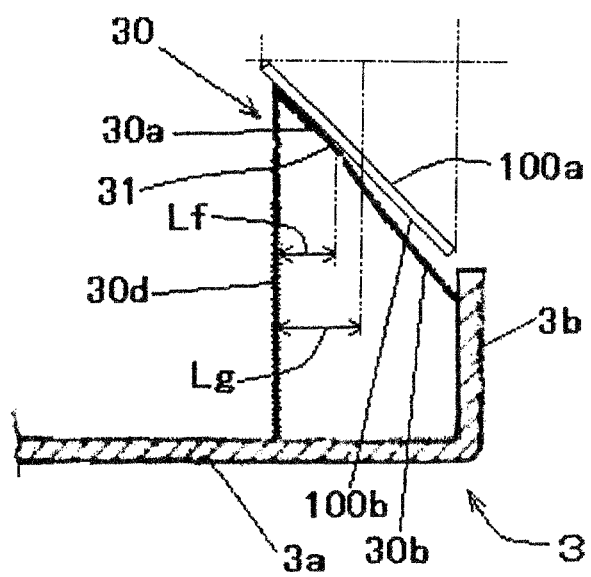
FIG. 5C is a side view of the second part of the retaining means with a flexible sheet-formed in-cartridge memory tag placed thereon.

FIGS. 5A, 5B and 5C show the second part retaining structure incorporated in the second mating shell half 3 for holding down the flexible sheet-formed in-cartridge memory tag 100 against the supporting braces 20 from the back side 100b. The second part retaining structure comprises at least one, preferably a pair of holding braces 30 (see FIG. 2) extending vertically from the base plate section 3a of the second mating shell half 3. Each of the holding braces 30 is formed as a modified polygon-shaped braces having an angled leading surface 30a, an angled trailing surface 30b and a back surface 30d between opposite sides 30c which is fixedly disposed, or otherwise formed as an integral part of the second mating shell half 3, between the base plate section 3a and the peripheral wall section 3b in the memory tag chamber $S_2$. The angled leading surface 30a is angulated at a depression angle $\theta_1$, i.e. 45° in this embodiment, with the base plate section 3a and in parallel to the angled surface 20a of the supporting braces 20 so as to hold down the flexible sheet-formed in-cartridge memory tag 100 supported at the given angle $\theta_1$ (45°) on the supporting braces 20 from the back side 100b. The angled trailing surface 30b extends at a depression angle $\theta_2$ greater than the depression angle $\theta_1$ (45°) of the angled leading surface 30b with the base plate section 3a continuously from the angled leading surface 30a to an inner side of the peripheral wall section 3b so as thereby to form a wedge-shaped capture groove 3c between the angled trailing surface 30b and the peripheral wall section 3b within the second mating shell half 3. The angled trailing surface 30b may comprises a plurality of surfaces extending at angles gradually increasing, respectively, with the base plate section 3a continuously from one another. In his case, the wedge-shaped capture groove 3c is increased in depth and area. The back surface 30d extends straight from the base plate section 3a to the angled leading surface 30a.

As shown in FIG. 5C, the holding brace has a boundary between the angled leading surface 30a and the angled trailing surface 30b located on one side of a center of gravity of the flexible sheet-formed in-cartridge memory tag 100 appropriately supported on the supporting braces opposite to the peripheral wall section 3b of the second mating shell half 3. In other words, the holding brace 30 has a boundary between the angled leading surface and the angled trailing surface at a distance Lf from the back surface 30d which is smaller than a distance Lg of a center of gravity of the flexible sheet-formed in-cartridge memory tag 100 appropriately supported on the supporting braces 20 from the bottom edge 100f. In this instance, the term "position of the flexible sheet-formed in-cartridge memory tag 100 appropriately placed on the angled leading surface 30a" shall means and refer to the position of the flexible sheet-formed in-cartridge memory tag 100 retained at the given angle within the allowable limits determined by the bottom edge stoppers 21 and the lateral edge stoppers 22 by the retaining means when the magnetic tape cartridge 1 is flipped upside down after temporarily coupling.

In the above embodiment, the second mating shell half 3 may be provided with more than two holding braces 30. In this case, the holding braces 30 can be arranged at even or uneven intervals. For example, when the flexible sheet-formed in-cartridge memory tag 100 has an IC component incorporated therein, it is preferred to arrange the holding braces 30 so as to put the IC component between two adjacent holding braces 30. This arrangement of the holding braces 30 prevents the IC component from damaging due to external shocks.

Figure 6A:
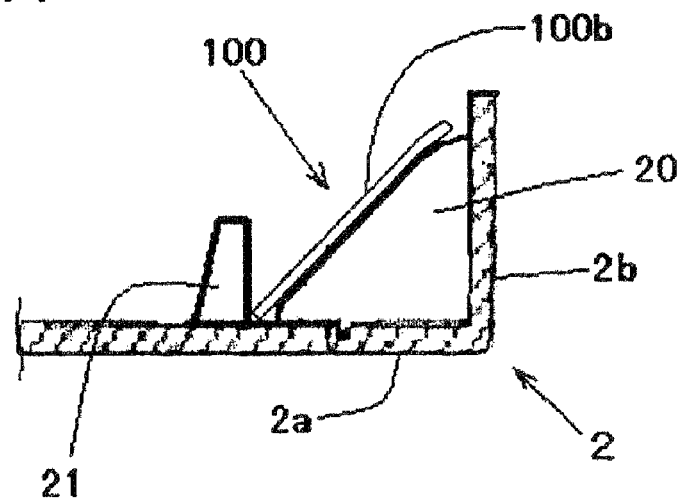
FIG. 6A is a side view of a part of the first mating shell half with a flexible sheet-formed in-cartridge memory tag appropriately supported in position on the first part of the retaining means.
Figure 6B:
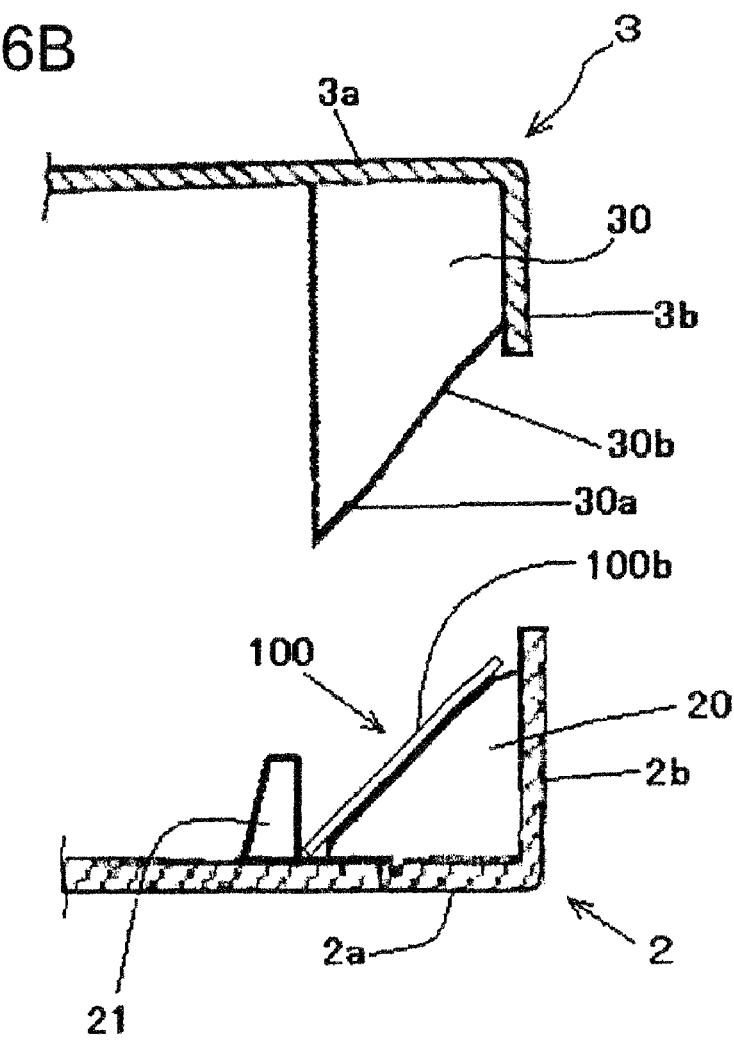
FIG. 6B is a side view of parts of the mating shell halves in a state just before the case shell is temporarily coupled.
Figure 6C:
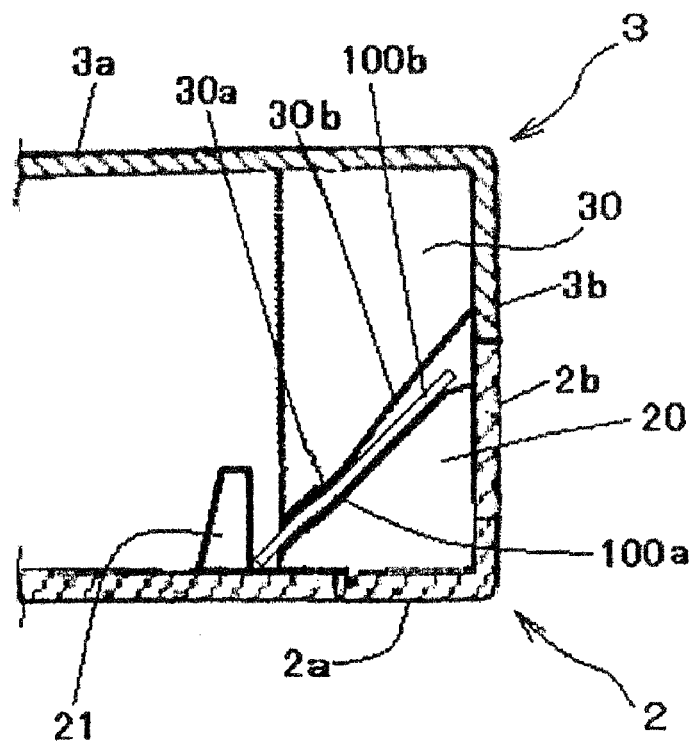
FIG. 6C is a side view of a part of the temporarily coupled case shell with a flexible sheet-formed in-cartridge memory tag appropriately retained in position.

FIGS. 6A through 6H show the magnetic tape cartridge 1 at various assembling stages. As shown in FIG. 6A, when installing a flexible sheet-formed in-cartridge memory tag 100 in the first mating shell half 2, the flexible sheet-formed in-cartridge memory tag 100 is placed on the supporting braces 20 with the accessible side 100a facing down so as to keep the accessible side 100a in contact with the angled surfaces 20a At this time, the flexible sheet-formed in-cartridge memory tag 100 is prevented from causing unallowable lengthwise and crosswise movement by the forward edge stoppers 21 and the lateral edge stoppers 22. In this way, the flexible sheet-formed in-cartridge memory tag 100 is supported at the given angle $\theta_1$ with respect to the base plate section 2a of the first mating shell half 2. Subsequently, as shown in FIG. 6B, the first and second mating shell halves 2 and 3 are temporarily coupled together in such a manner that the holding braces 30 of the second mating shell half 3 hold down the flexible sheet-formed in-cartridge memory tag 100 from the back side 100b. The supporting braces 20 of the first mating shell half 2 and the hold-down braces 30 of the second mating shell half 3 are designed in dimensions to provide a clearance approximately equal to the thickness of the flexible sheet-formed in-cartridge memory tag 100 between the angled surfaces 20a of the supporting braces 20 and the angled leading surfaces 30a of the holding braces 30 when the first and second mating shell halves 2 and 3 are temporarily coupled together. It is preferred that the clearance is slightly large enough to allow the flexible sheet-formed in-cartridge memory tag 100 to be dragged between the angled surfaces 20a of the supporting braces 20 and the angled leading surfaces 30a of the holding braces 30 when the flexible sheet-formed in-cartridge memory tag 100 is kicked or pushed. In consequence, as shown in FIG. 6C, the flexible sheet-formed in-cartridge memory tag 100 is firmly sandwiched by and between the supporting braces 20 and the hold-down braces 30 when the first and second mating shell halves 2 and 3 are coupled together. More specifically, the retaining means appropriately positions the flexible sheet-formed in-cartridge memory tag 100 within a specified area defined by the edge stoppers 21 and 22. Subsequently, in order to put the first and second mating shell halves 2 and 3 ready for completely coupling by means of setscrews, the temporarily coupled case shell is flipped upside down.

Figure 6D:
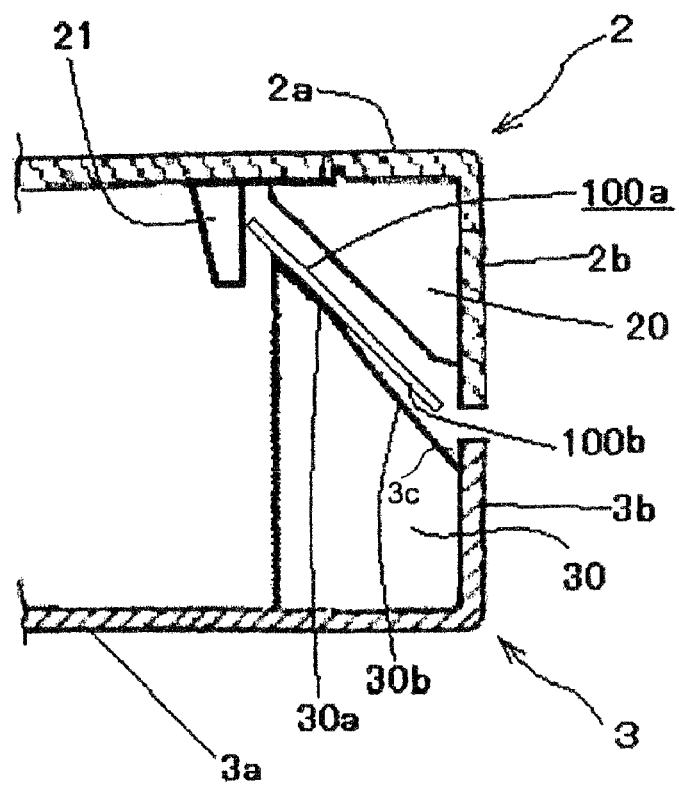
FIG. 6D is a side view of the part of the temporarily coupled case shell at the precise moment that the temporarily coupled case shell is flipped upside down and accidentally separated at their peripheral wall sections of the first and second mating shell halves.
Figure 6E:
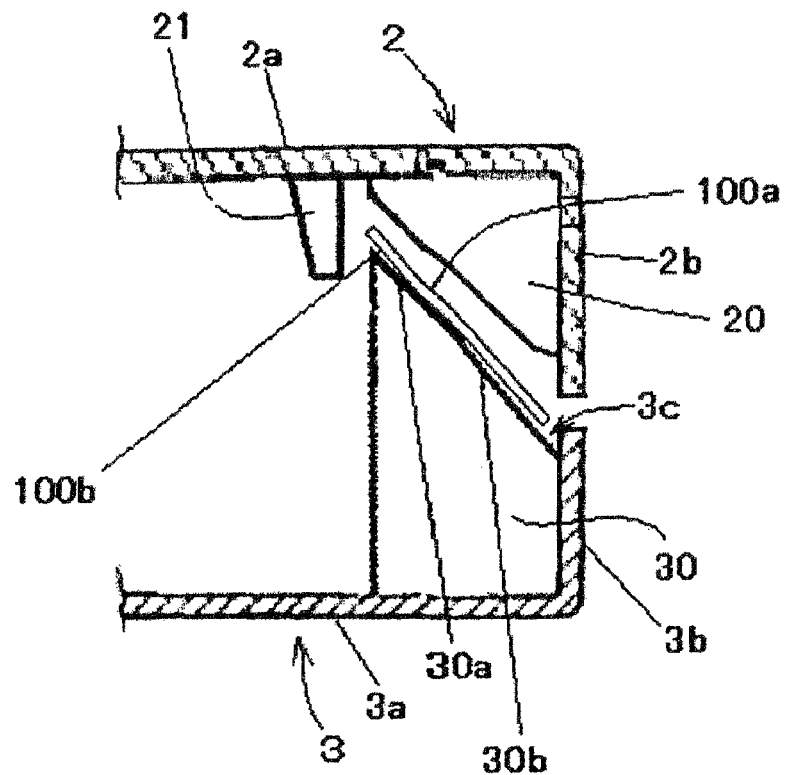
FIG. 6E is a side view of the part of the temporarily coupled case shell in a state where a flexible sheet-formed in-cartridge memory tag is released from the retaining means.
Figure 6F:
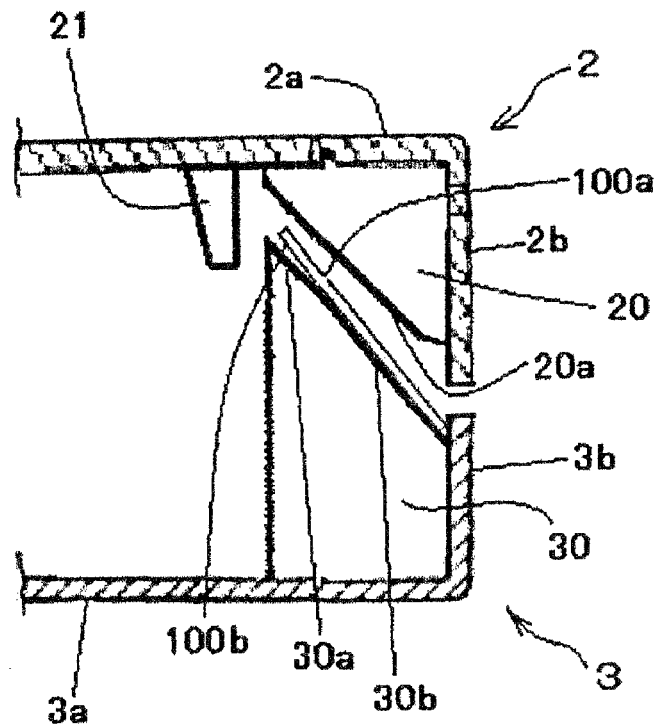
FIG. 6F is a side view of the part of the temporarily coupled case shell in a state where a flexible sheet-formed in-cartridge memory tag slides down and is captured in capture grooves formed between the second part of the retaining means and the peripheral wall section of the second mating shell half.
Figure 6G:
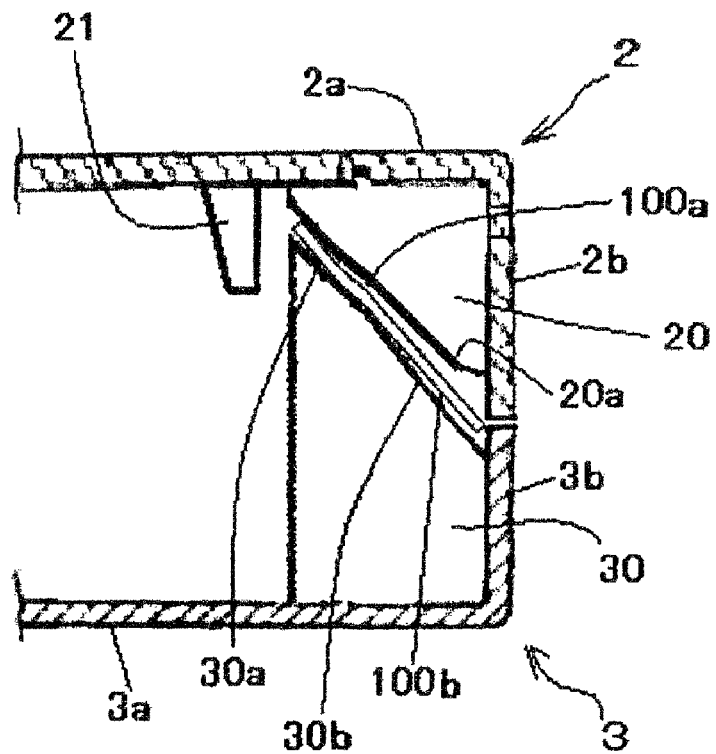
FIG. 6G is a side view of the part of the temporarily coupled case shell in a state where the first mating shell half is moved down to the second mating shell half to close a clearance gap between the peripheral wall sections of the first and second mating shell halves.

If the first mating shell half 2 is undesirably lifted up or separated apart from the second mating shell half 3 under the influence of elastic members such as the coil spring 9, or otherwise for some reason, when the temporarily coupled case shell is flipped upside down, the flexible sheet-formed in-cartridge memory tag 100 is instantaneously supported only on the angled leading surface 30a of the holding braces 30 as shown in FIG. 6D and, immediately thereafter, as the flexible sheet-formed in-cartridge memory tag 100 on the angled leading surfaces 30a of the holding braces 30 has the center of gravity on a side of the boundary 31 between the angled leading and trailing surfaces 30a and 30b closer to the peripheral wall section 3b of the second mating shell half 3, the flexible sheet-formed in-cartridge memory tag 100 slightly turns downward with an axis of turn on the boundary 31 as shown in FIG. 6D and slides down on the angled trailing surfaces 30b until received at the bottom edge 100f in the wedge-shaped capture grooves 3c between the angled trailing surfaces 30b and the peripheral wall section 3b as shown in FIG. 6F. That is, if a clearance gap is formed between the peripheral wall sections 2b and 3b of the first and second mating shell halves 2 and 3, a conventional problem encountered by a temporarily coupled case shell lies in the fact that the flexible sheet-formed in-cartridge memory tag 100 flies out of the magnetic tape cartridge 1 through the clearance gap, or otherwise, is nipped between the peripheral wall sections 2b and 3b of the first and second mating shell halves 2 and 3. By contrast, because the magnetic tape cartridge 1 of the present invention catches the flexible sheet-formed in-cartridge memory tag 100 at the top edge 100c in the wedge-shaped capture grooves 3c, the flexible sheet-formed in-cartridge memory tag 100 is prevented from getting out of the the magnetic tape cartridge 1 through the clearance gap or being nipped between the peripheral wall sections 2b and 3b of the first and second mating shell halves 2 and 3.

Figure 6H:
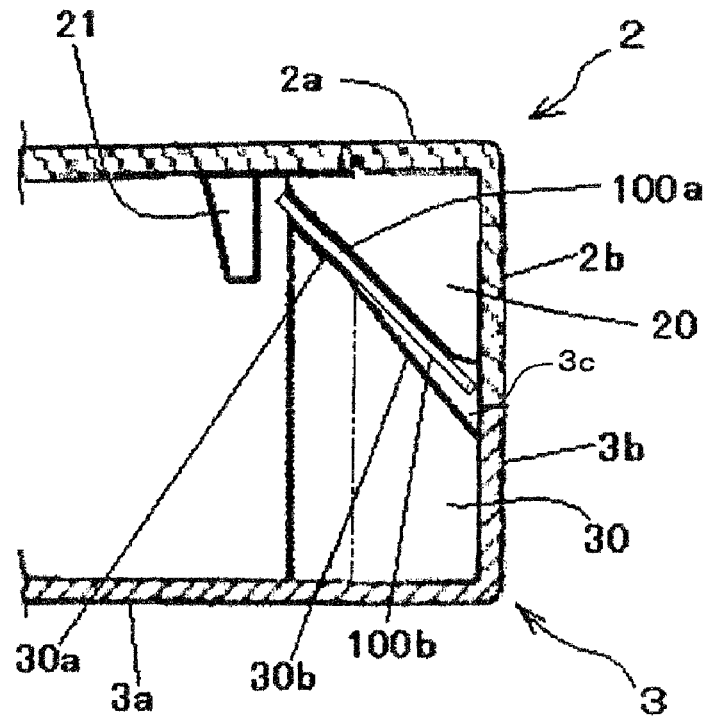
FIG. 6H is a side view of the part of the temporarily coupled case shell in a state where the first and second mating shell halves are connected together again.

When appressing the first mating shell half 2 against the second mating shell half 3 to bring the peripheral wall sections 2b and 3b into contact with each other so as thereby to close the clearance gap, the supporting braces 20 of the first mating shell half 2 presses an upper portion of the flexible sheet-formed in-cartridge memory tag 100 staying on the angled trailing surfaces 30b of the holding braces 30 of the second mating shell half 3. In consequence, the flexible sheet-formed in-cartridge memory tag 100 is forced to tun upward with an axis of rotation on the boundary 31 until the back side 100b of the flexible sheet-formed in-cartridge memory tag 100 is brought into contact with the angled leading surfaces 30a of the holding braces 30 of the second mating shell half 3. However, because the peripheral wall section 3b of the second mating shell half 3 stands in the way of the bottom top edge 100c of the flexible sheet-formed in-cartridge memory tag 100, the flexible sheet-formed in-cartridge memory tag 100 is elastically deflected in bending and then bounced off from the peripheral wall section 3b by a restoring force, thereby restoring its original form. In consequence, the flexible sheet-formed in-cartridge memory tag 100 is slightly forced upward as remaining nipped between the angled surfaces 20a of the supporting braces 20 and the angled leading surfaces 30a of the holding braces 30. When the peripheral wall sections 2b and 3b are completely brought into contact with each other, in other words, when the clearance gap is completely closed, the flexible sheet-formed in-cartridge memory tag 100 is firmly sandwiched by and between the supporting braces 20 of the first mating shell half 2 and the holding braces 30 of the second mating shell half 3 as shown in FIG. 6H. In this way, the flexible sheet-formed in-cartridge memory tag 100 off-balanced in position due to formation of a clearance gap between the peripheral wall sections 2b and 3b is reliably prevented from getting out of the magnetic tape cartridge 1 through the clearance gap that is possibly formed between the peripheral wall sections 2b and 3b during or after flipping or turning the temporarily coupled case shell upside down and is appropriately retained in position by the retailing means when completely coupling or fixing the first and the second mating shell halves 2 and 3 by means of setscrews.

Figure 7:
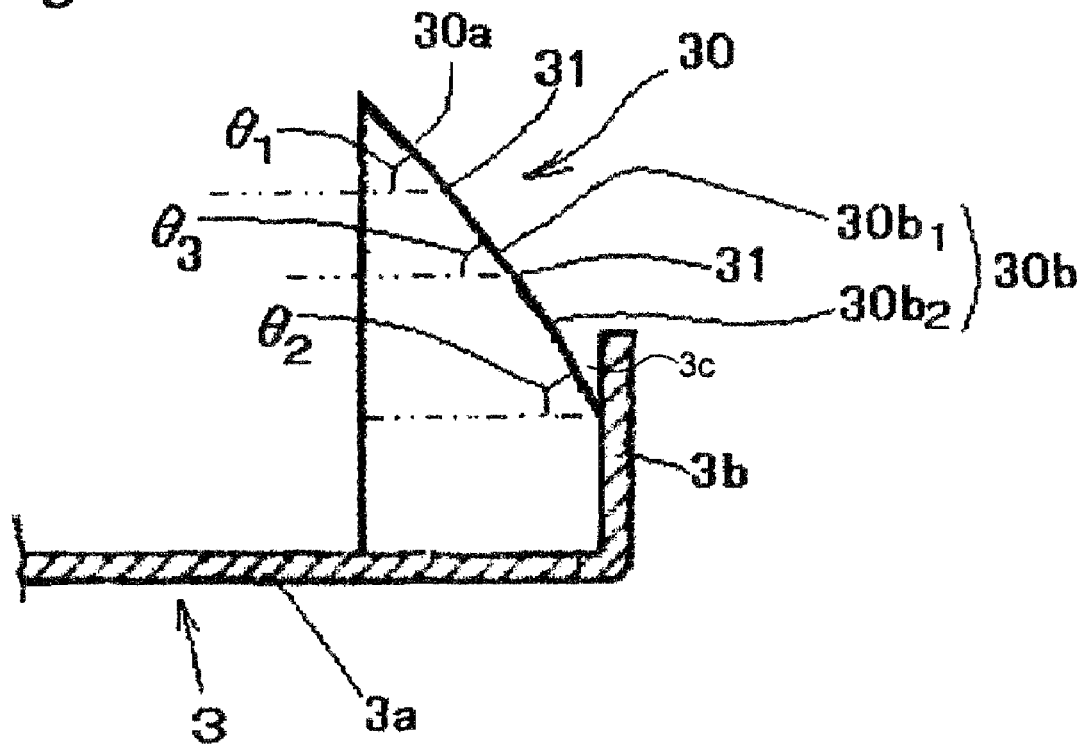
FIG. 7 is a side view of a variant of the holding brace of the second part of the retaining means.

FIG. 7 shows a variant of the holding brace 30 of the second mating shell half 3 which has an angled leading surface 30a having the same dimensions as that of the previous embodiment and an angled trailing surface 30b comprising a first angled surface $30b_1$ continuously extending from the angled leading surface 30a and a second angled surface $30b_2$ continuously extending from the first angled surface $30b_1$. The angled leading surface 30a extends at a depression angle $\theta_1$ with the base plate section 3a of the second mating shell half 3 which is equal to the elevation angle $\theta_1$ of the angled leading surface 20a of the supporting brace 20 of the first mating shell half 2. The first angled surface $30b_1$ and the second angled surface $30b_2$ extend at depression angles $\theta_3$ and $\theta_2$, respectively, with respect to the base plate section 3a of the second mating shell half 3 which are gradually increased from the depression angle $\theta_1$ of the angled leading surface 30a in this order. The retaining means comprising the variant holding brace 30 provides a wedge-shaped capture groove 3c increased in depth and area and, in consequence, is capable of more reliably capturing the flexible sheet-formed in-cartridge memory tag 100.

Figure 8:
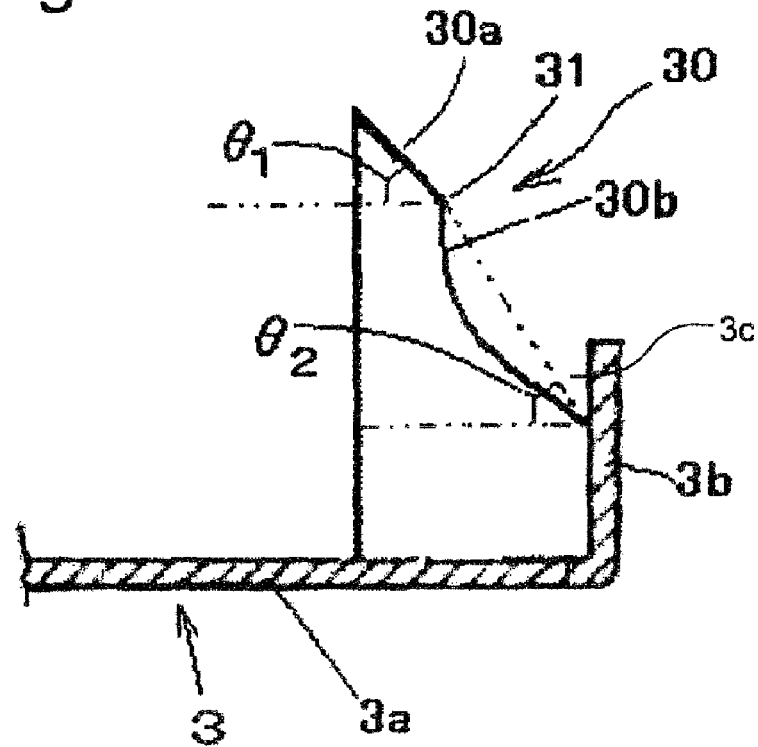
FIG. 8 is a side view of another variant of the holding brace of the second part of the retaining means.
Figure 9:
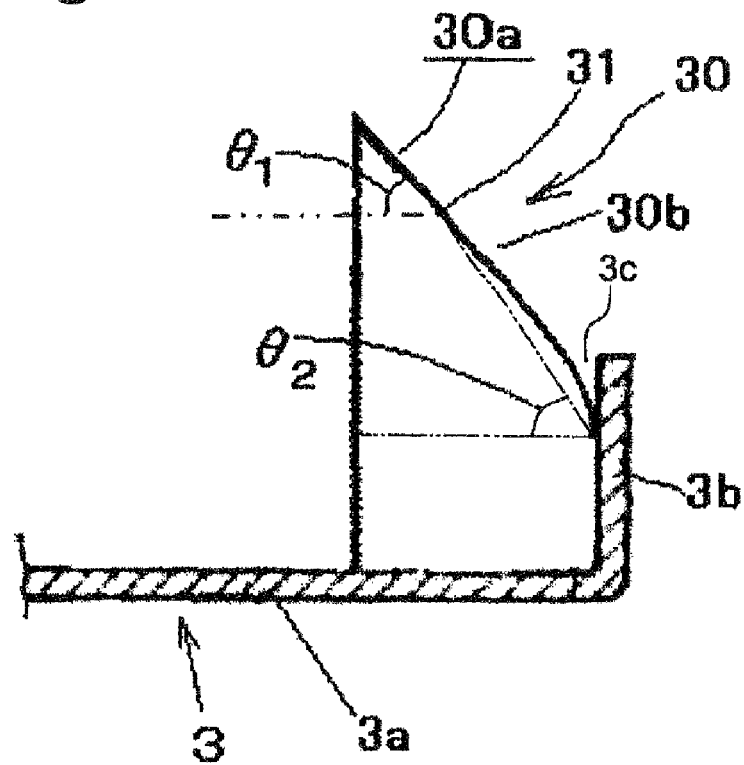
FIG. 9 is a side view of a still another variant of the holding brace of the second part of the retaining means.
Figure 10:
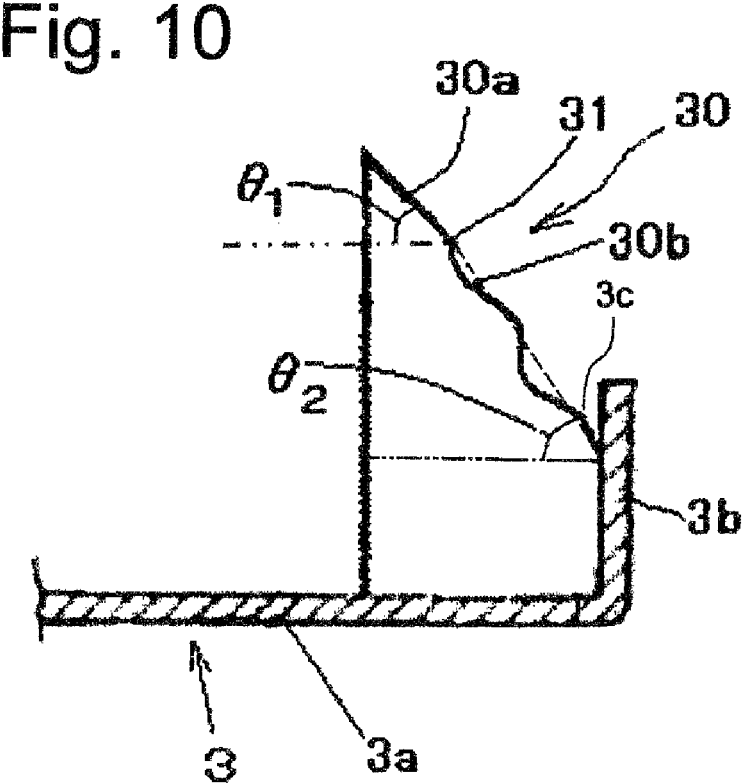
FIG. 10 is a side view of a further variant of the holding brace of the second part of the retaining means.

The holding brace 30 of the second mating shell half 3 may have an angled leading surface 30a having the same dimensions as that of the previous embodiment and a curved or waved trailing surface 30b as shown in FIGS. 8 to 10. More specifically, the holding brace 30 may have a concavely curved trailing surface 30b as shown in FIG. 8, a convexly curved trailing surface 30b as shown in FIG. 9 or a waveform or corrugated surface 30b as shown in FIG. 10. In these variants, a depression angle $\theta_2$ of the trailing surface 30b is defined as an angle of a virtual line connecting the end of the leading surface 30a and an intersection between the trailing surface 30b and the peripheral wall section 3b with the base plate section 3a of the second mating shell half 3. As apparent from these variants of the holding brace 30, the trailing surface 30b is not bounded by surface configurations as long as having a depression angle $\theta_2$ greater than the elevation angle $\theta_1$ of the leading surface 30a.

As just described above, the cartridge case and the magnetic tape cartridge of the present invention eliminate the problems encountered by conventional cartridge cases and magnetic tape cartridges. In particular, since the flexible sheet-formed in-cartridge memory tag 100 is temporarily but reliably captured in the capture grooves 3c provided between the holding braces and the peripheral wall section of the second mating shell half 3 even if the temporarily coupled mating shell halves 2 and 3 are separated apart the flexible sheet-formed in-cartridge memory tag 100 is held tight at a given angle by the retaining means so as to be appropriately positioned in a design situation. The retaining means is implemented only by modifying configurations of conventional holding and/or supporting brace members and, accordingly, contributes to a cost reduction of the cartridge case and the magnetic tape cartridge.

It is also to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A cartridge case for a magnetic tape cartridge provided with a tape reel received for rotation in said cartridge case and a flexible sheet-formed in-cartridge memory tag fixedly received in said cartridge case, said cartridge case comprising:
    a case shell comprising two mating shell halves each of which comprises a rectangular base plate section and a peripheral wall section extending upright from and surrounding said rectangular base plate section and which form a reel chamber therebetween for receiving said tape reel for rotation therein and a memory tag chamber formed out of said reel chamber therebetween for receiving said flexible sheet-formed in-cartridge memory tag therein by mating said peripheral wall sections of said two mating shell halves with each other; and
    retaining means disposed in said memory tag chamber for fixedly retaining said flexible sheet-formed in-cartridge memory tag at a given angle, said retaining means comprising at least a pair of supporting braces fixedly provided in one of said two mating shell halves for supporting said flexible sheet-formed in-cartridge memory tag thereon and at least one holding brace fixedly provided in the other of said two mating shell halves for holding down said flexible sheet-formed in-cartridge memory tag mounted on said supporting braces;
    wherein each said supporting brace has an angled surface extending toward said peripheral wall section of said one mating shell half at an elevation angle equal to said given angle and said holding brace has an angled leading surface extending toward said peripheral wall section of said other mating shell half at a depression angle equal to said given angle and an angled trailing surface extending continuously from said angled leading surface to said peripheral wall section of said other mating shell half at a depression angle greater than said given angle so as to form a wedge-shaped capture groove between said angled trailing surface and said peripheral wall section of said other mating shell half.

2. The cartridge case for a magnetic tape cartridge as defined in claim 1, wherein said holding brace has a boundary between said angled leading surface and said angled tailing surface located on one side of a center of gravity of said flexible sheet-formed in-cartridge memory tag mounted on said supporting braces opposite to said peripheral wall section of said other mating shell half.

3. The cartridge case for a magnetic tape cartridge as defined in claim 1, wherein said angled trailing surface comprises a plurality of angled surfaces having depression angles gradually increasing in order from said angled leading surface.

4. A magnetic tape cartridge comprising:
- a tape reel with a magnetic tape wound thereon;
- a flexible sheet-formed memory tag;
- a case shell forming a cartridge case which comprises two mating shell halves each of which comprises a rectangular base plate section and a peripheral wall section extending upright from and surrounding said rectangular base plate section and which form a reel chamber therebetween for receiving said tape reel for rotation therein and a memory tag chamber formed out of said reel chamber therebetween for receiving said flexible sheet-formed memory tag therein by mating said peripheral wall sections of said two mating shell halves with each other; and
- retaining means disposed in said memory tag chamber for fixedly retaining said flexible sheet-formed memory tag at a given angle, said retaining means comprising at least a pair of supporting braces fixedly provided in one of said two mating shell halves for supporting said flexible sheet-formed memory tag thereon and at least one holding brace fixedly provided in the other of said two mating shell halves for holding down said flexible sheet-formed memory tag mounted on said supporting braces;

wherein each said supporting brace has an angled surface extending toward said peripheral wall section of said one mating shell half at an elevation angle equal to said given angle and said holding brace has an angled leading surface extending toward said peripheral wall section of said other mating shell half at a depression angle equal to said given angle and an angled trailing surface extending continuously from said angled leading surface to said peripheral wall section of said other mating shell half at a depression angle greater than said given angle so as to form a wedge-shaped capture groove between said angled trailing surface and said peripheral wall section of said other mating shell half.

5. The magnetic tape cartridge as defined in claim 4, wherein said holding brace has a boundary between said angled leading surface and said angled trailing surface located on one side of a center of gravity of said flexible sheet-formed memory tag supported on said supporting braces opposite to said peripheral wall section of said other mating shell half.

6. The magnetic tape cartridge as defined in claim 4, wherein said angulated trailing surface comprises a plurality of surfaces having depression angles gradually increasing in order from said angulated leading surface.

7. The magnetic tape cartridge as defined in claim 6, wherein said retaining means retains said flexible sheet-formed memory tag so as to put said flexible sheet-formed memory tag with an accessible surface facing to said peripheral wall section of said one mating shell half of said case shell at said elevation angle.

\* \* \* \* \*